March 7, 1967 C. R. BARLOW 3,307,866
QUICK-DISCONNECT LATCH
Filed July 17, 1964
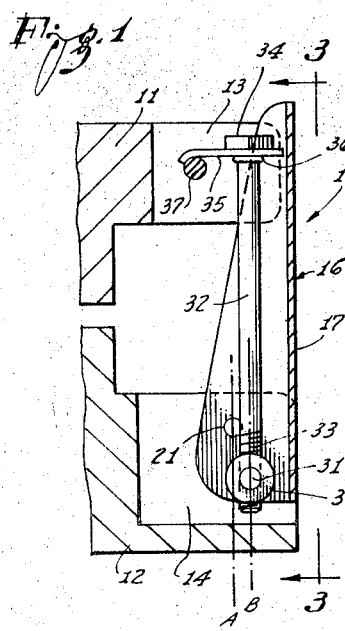
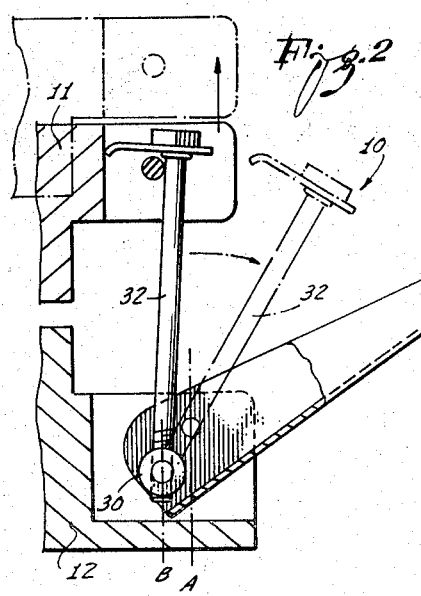
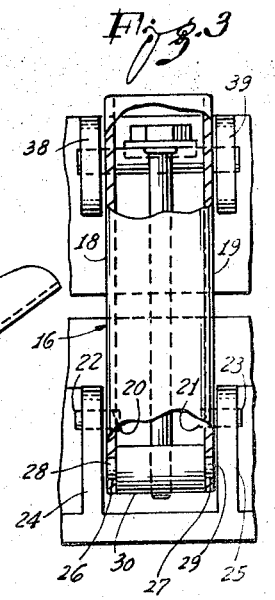
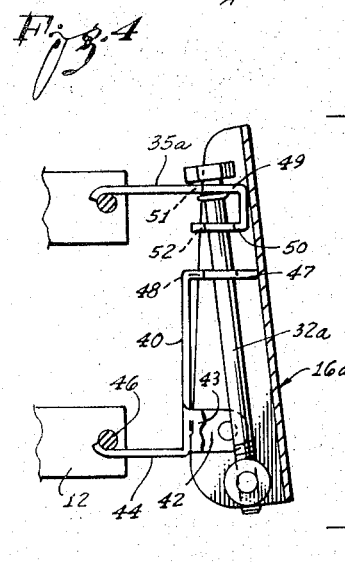
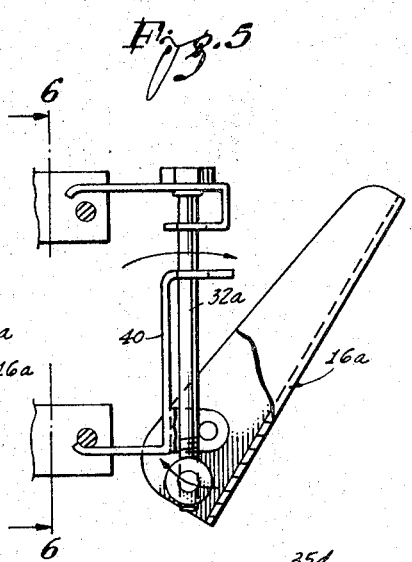
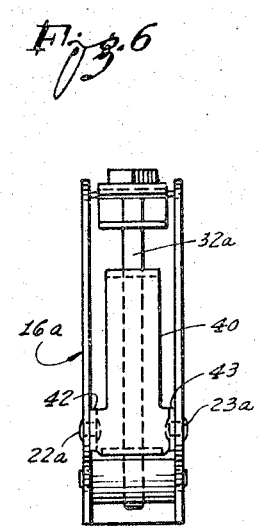
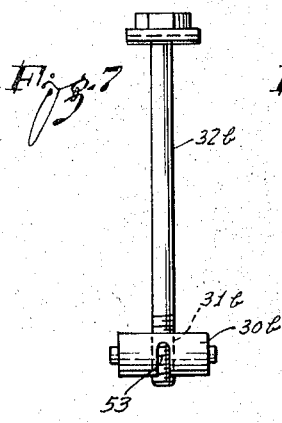
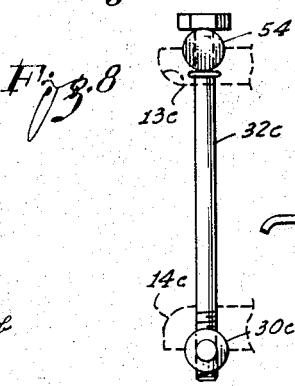
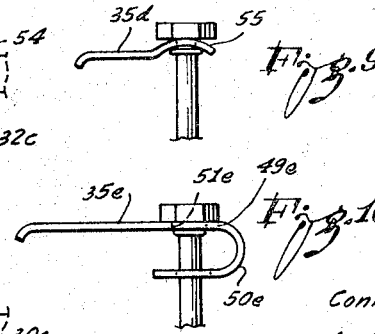
INVENTOR:
Conrad R. Barlow
By Smyth, Roston & Pavitt
Attorneys

United States Patent Office 3,307,866
Patented Mar. 7, 1967

3,307,866
QUICK-DISCONNECT LATCH
Conrad R. Barlow, 103 Via Mesa Grande,
Redondo Beach, Calif. 90277
Filed July 17, 1964, Ser. No. 383,339
4 Claims. (Cl. 292—113)

This invention relates to an improvement in latch mechanisms for clamping together two parts which are movable relative to one another and which provides increased adjustability and more universal application.

Conventional latch mechanisms are designed and selected to fasten or clamp parts movable relative to one another, such as a lid or cover and its base, according to the distance therebetween when in clamped position and are not adjustable to fit even minor variations in this distance, nor can they accommodate different sizes of lids and bases because they would require adjustability for wide variations of this distance. This, of course, limits such latch mechanisms and accordingly requires a large number of latch mechanism sizes to accommodate various applications.

A latch mechanism constructed in accordance with the teachings of this invention has the important feature of not only being adjustable to minor variations in the distance between the two parts to be clamped, but also is so constructed to use a standard and readily available part which may be selected so that the latch mechanism can be made to fit a wide range of sizes of parts having a wide range of distances between them.

Such a latch mechanism has a body member for actuating the latch mechanism from latched to unlatched position and vice-versa, and a trunnion accommodating a tension member which may be a standard commercially available bolt the length of which can be selected according to the distance between the parts to be clamped.

Another feature of the invention is that when the parts are clamped together, the bolt can be adjusted if necessary so as to further tighten the two clamped parts together; a feature also not found in presently available latch mechanisms.

Still another feature of the invention is the fact that the bolt may be locked in the latch mechanism to prevent inadvertent removal during clamping which feature is particularly useful where the latch mechanism is used where it is subject to vibrations such as in truck or aircraft use.

Other and additional features and advantages of the present invention will become apparent from the following detailed description and the accompanying drawings, wherein:

FIGURE 1 shows the latch mechanism constructed in accordance with the teachings of this invention in its closed or latched position and shown attached to one of the parts to be clamped;

FIGURE 2 shows the latch mechanism in its unlatched position;

FIGURE 3 is a side elevational view taken along line 3—3 of FIGURE 1 and looking in the direction of the arrows;

FIGURE 4 is another embodiment of the latch mechanism utilizable where the body member is not attached to one of the parts to be clamped;

FIGURE 5 is the latch mechanism illustrated in FIGURE 4 shown in its unlatched position;

FIGURE 6 is a side elevational view taken along line 6—6 of FIGURE 5 and looking in the direction of the arrows;

FIGURE 7 illustrates the locking feature for the bolt;

FIGURE 8 shows another form of a clamp for the bolt and utilizable in the latch mechanisms shown in the previous figures;

FIGURE 9 illustrates another form of clamp or hook utilizable with the bolt disclosed in the previous figures; and FIGURE 10 is still another form of clamp utilizable with the bolt shown in the previous figures.

Turning now specifically to FIGURES 1–3, inclusive, it can be seen that the latch mechanism is identified in its entirety as 10 and is in its latch position for clamping members 11 and 12 together adjacent their respective flanges 13 and 14. Members 11 and 12 can be any parts which could be clamped such as, for example, member 11 can be a lid and member 12 may be its base.

Latch mechanism 10 comprises a body member 16 for hand actuation of the latch mechanism and is formed of any suitable material such as sheet metal. Body member 16 is provided with a back 17 and a pair of forwardly-extending side flanges 18 and 19 that are relatively large at the base end of the body and taper towards the handle end of the body. Body member 16 is provided with a pair of apertures 20 and 21 in the sides 18 and 19 to receive pins 22 and 23, which pins are fixed in vertically extending walls 24 and 25 of flange 14 so that the body member 16 can rotate about the pins 22 and 23 in the manner shown in FIGURE 2. Pins 22 and 23 also, of course, attach the latch mechanism 10 to the part 12. The side walls 18 and 19 are also provided with apertures 26 and 27 to receive extensions 28 and 29 on a trunnion 30 disposed therebetween for rotation about the extensions. It is to be noted that the axis of the trunnion 30 is spaced from the axis of pins 22 and 23 towards the base end of the body member 16 and the axis of pins 22 and 23 are slightly offset from the axis of rotation of the trunnion 30, as more clearly shown in FIGURE 1 where A indicates the body axis and B represents the axis of the trunnion. With the rotation of the body member about its axis, i.e., pins 22 and 23, the axis of the trunnion, i.e., the axis of extensions 28 and 29, moves from one side of the body axis (the right side as shown in FIGURE 1) to the other side (the left side as shown in FIGURE 2) so as to provide an over-center latching mechanism.

The trunnion 30 is also centrally apertured and threaded as at 31 transverse its rotational axis to receive tension member in the form of a standard and commercially available bolt 32 having conventional threads 33 so that the latter may be threaded into the trunnion. The opposite end of the bolt 32 is provided with a conventional head 34 and extends through an aperture in a clamp 35 that may be held adjacent the underside of the head by any suitable means such as ring 36.

With the above structure, the bolt 32 being threadable into the trunnion 30 provides an adjustable means for regulating the distance between the trunnion 30 and the clamp 35 so that the clamp 35 will effectively clamp or hold pin 37 of the part 11 disposed in apertures in the vertical walls 38 and 39 of flange 13. It is to be noted that when the latch mechanism is in its latching position as shown in FIGURE 1, the head 34 is accessible so that if the bolt is not threaded into the trunnion 30 sufficiently far to properly hold the lid 11 on the base 12, the bolt can be turned to shorten the distance between the head and the trunnion to provide a tight fit. Contrariwise, if the clamp 35 will not reach the pin 37, the pin can be unthreaded to provide more distance between the head 34 and the trunnion. At the same time, because of the over-center operation of the trunnion 30 and the pivot of the body member, the bolt can be released from its clamping position to an unclamping position as shown in FIGURE 2 free and clear of the pin 37 to permit removal of the part 11.

FIGURES 4, 5 and 6 illustrate another embodiment of the latching mechanism, and like parts performing the same function in these figures and the other FIGURES 7–10 as described in connection with FIGURES 1–3, inclusive, are given the same reference numerals with the addition of the suffix *a, b, c, d* and *e*. In the embodiment shown in FIGURES 4–6, however, the body member 16a is not permanently fixed for rotation on the base 12, but a second clamp 40 is provided. This second clamp 40 is provided with a pair of extensions 42 and 43 which receive pins 22a and 23a and form the pivotal point for the body member 16a, the same as the pins 22 and 23 function in the previously described embodiment. Clamp 40 is also provided with an extension 44 which is used to clamp about a pin 46 forming an integral part of the base 12. This clamp 40 is also provided with an arm or extension 47 apertured as at 48 to loosely engage the bolt 50a to limit the angular divergence of the clamp from the tension member. In this embodiment, the relationship of the pivot points to the body axis and the trunnion axis is the same, and the over-center movement of the trunnion axis relative to the body axis during latching and unlatching of the latch mechanism is the same. However, instead of the clamp 35 in FIGURE 1, a cantilever type clamp is provided which comprises doubling back the end nearest the body member so as to form a U-shape connection with the bolt 32a. The arms 49 and 50 of the U-shape connection are provided with large apertures 51 and 52 to permit relative movement of the bolt 32a during clamping operation in a manner shown.

FIGURE 7 shows a trunnion 30b and bolt means 32b which are functionally identical with the trunnions 30 and 30a except that trunnion 30b is slotted as at 53 adjacent and overlapping a portion of the threaded aperture 31b transverse to the axis of the trunnion so that during the clamping operation, the forces tending to pull the bolt 32b out of the trunnion 30b serve to clamp or lock the bolt therein. This particular embodiment is particularly helpful where the latch mechanism may be used where vibrations may cause the bolt, such as shown in FIGURES 1–6, inclusive, to unthread and thus loosen the lid. While one form of lock for the bolt 32b is shown, this is by way of illustration and the bolt itself could be of the self-locking type, also commercially available, if desired.

FIGURE 8 shows a bolt 32c which is similar to the bolts shown in the previous figure except that the clamp is replaced with a second trunnion 54 which may cooperate with another flange such as 14 of another part 14c.

FIGURE 9 shows still another form of clamp 35d which is provided with a curved end portion 55 adjacent the head of the bolt to provide a radius for direct translation of the forces when the head is in a position such as shown in FIGURE 4.

FIGURE 10 shows still another form of clamp 35e with a U-shaped connection 50e, the function and operation of which is similar to the clamp shown in FIGURE 4 except that the U-shaped portion is curved.

While the bolt 32 shown in the FIGURES 1–10, inclusive, is shown of a length substantially equal to the length of the body member 16 inasmuch as the same is a standard bolt, it can be of any length, depending upon the distance between the trunnion and the part to be clamped.

While only a few embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:
1. A quick-disconnect mechanism for releasably interconnecting two parts, comprising:
   a clamp member to releasably engage one of the two parts, said clamp member having an aperture therein;
   a tension member extending through said aperture and having an enlargement thereon at a first end thereof of non-circular cross section larger than the aperture for engagement with the clamp member;
   a body having a base end and a handle end, said body having a pivot axis for connection to the other of said two parts; and
   a trunnion pivotally connecting the second end of the tension member with the body to permit the body to be swung towards the tension member through an operating angle from a first release position extending laterally of the tension member to a second latching position,
   the axis of the trunnion being spaced from said pivot axis towards the base end of the body and being offset from the pivot axis to swing past center when the body swings through the operating angle,
   said trunnion having a tapped bore and the second end of the tension member being screw-threaded and extending into said bore in screw-threaded engagement with the trunnion whereby said enlargement at the first end of the tension member may be utilized to rotate the tension member for screw-threaded action in said bore to adjust the distance between the clamp member and the trunnion while said body is in its latching position with the latch mechanism interconnecting said two parts,
   where the tapped bore in the trunnion is a diametrical bore having a transverse slot at the far end of the bore to cause the trunnion to flex into clamping engagement with the bolt in response to tightening of the bolt.

2. A quick-disconnect mechanism for releasably interconnecting two parts, comprising:
   a clamp member to releasably engage one of the two parts, said clamp member having an aperture therein;
   a tension member extending through said aperture and having an enlargement thereon at a first end thereof of non-circular cross section larger than the aperture for engagement with the clamp member;
   a body having a base end and a handle end, said body having a pivot axis for connection to the other of said two parts; and
   a trunnion pivotally connecting the second end of the tension member with the body to permit the body to be swung towards the tension member through an operating angle from a first release position extending laterally of the tension member to a second latching position,
   the axis of the trunnion being spaced from said pivot axis towards the base end of the body and being offset from the pivot axis to swing past center when the body swings through the operating angle,
   said trunnion having a tapped bore and the second end of the tension member being screw-threaded and extending into said bore in screw-threaded engagement with the trunnion whereby said enlargement at the first end of the tension member may be utilized to rotate the tension member for screw-threaded action in said bore to adjust the distance between the clamp member and the trunnion while said body is in its latching position with the latch mechanism interconnecting said two parts,
   a second clamp member to engage the other of the two parts, said second clamp member being pivotally connected to said body at said pivot axis,
   where said second clamp member engages said tension member at a point spaced from said trunnion to limit angular divergence of the second clamp member from the tension member.

3. A combination as set forth in claim 2 in which said second clamp member is an angular sheet metal stamping having ears pivotally connected to said body and having an aperture loosely embracing the tension member.

4. A combination as set forth in claim 3 in which said sheet metal stamping forms two divergent arms, one arm being shaped and dimensioned to engage said other of the two parts, the other arm extending along the tension member, the sheet metal stamping being formed with a pair of ears near the juncture of the two arms and a third ear near the end of the second arm, the pair of ears being pivotally connected to said body and the third ear having the aperture that loosely embraces the tension member.

References Cited by the Examiner

UNITED STATES PATENTS

| 1,065,667 | 6/1913 | Donnell | 292—113 |
| 1,912,850 | 6/1933 | Kuck et al. | |
| 2,096,098 | 10/1937 | Fraysur | 292—113 |
| 2,523,760 | 9/1950 | Hayner | 292—256.75 |
| 2,574,281 | 11/1951 | Olson. | |
| 2,776,178 | 1/1957 | Kinney | 292—346 X |
| 3,021,162 | 2/1962 | Jahn | 292—256 X |
| 3,127,205 | 3/1964 | Griffiths et al. | 292—113 |

FOREIGN PATENTS 184,117   8/1922   Great Britain.

EDWARD C. ALLEN, *Primary Examiner.*

R. E. MOSES, *Assistant Examiner.*